Aug. 23, 1966 H. B. SCHULTZ 3,267,663
BRAKE MEANS
Filed Sept. 12, 1963
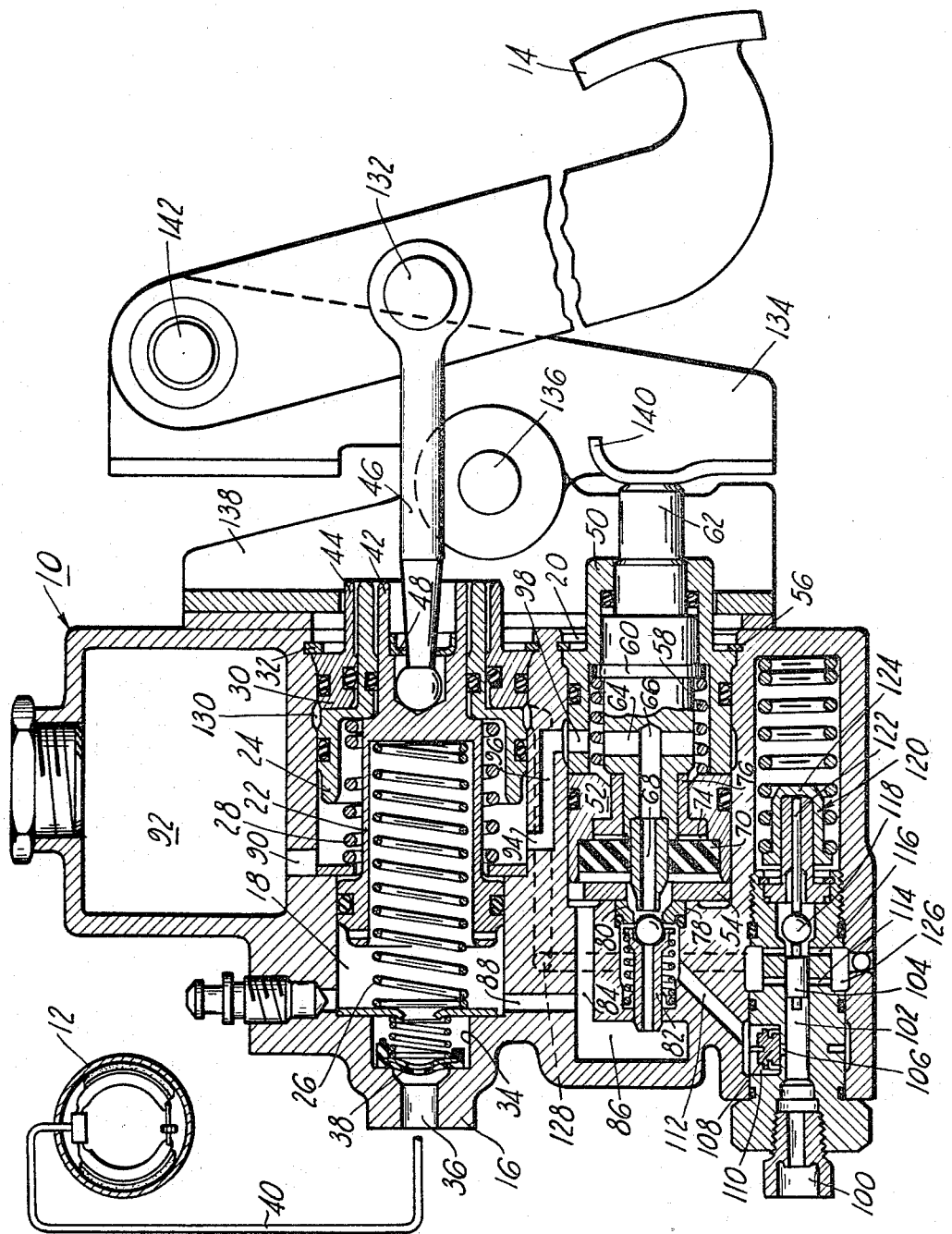
INVENTOR.
HAROLD B. SCHULTZ
BY
Richard G. Geib
ATTORNEY

United States Patent Office 3,267,663
Patented August 23, 1966

3,267,663
BRAKE MEANS
Harold B. Schultz, South Bend, Ind., assignor to The Bendix Corporation, South Bend, Ind., a corporation of Delaware
Filed Sept. 12, 1963, Ser. No. 308,514
3 Claims. (Cl. 60—10.5)

This invention relates to a full hydraulic power brake means for a vehicle.

In power brake systems it has become increasingly desirable to have little initial effort required to actuate the power system. In order to acquire this it has been thought that a high mechanical advantage was the answer. However, the high mechanical advantage had the defect of putting higher loads in a vehicle firewall and mountings during a no power brake application than they were designed for. Therefore, it is a principal object of this invention to provide independent selection of a valve actuating lever and a master cylinder lever to permit use of a high mechanical advantage and low initial effort for valve acuation and a commonly used mechanical advantage for no power operation. Thus, forces acting on the firewall and mountings may be limited to those normally encountered in no power or standard master cylinder installations.

It is a principal object of my invention to provide means to independently actuate a power valve and fluid pressurizing device.

Another object of my invention is to provide means to independently actuate a power valve and fluid pressurizing device having a mechanism for varying the mechanical advantage in said means between said power valve and said fluid pressurizing device.

It is also an object of my invention to provide an acuating mechanism having a walking beam pivotally connected to a fixed housing and pivotally mounting a manually operated lever which, in turn, pivotally mounts a force transmitting means for a fluid pressurizing device, said walking beam operatively connected to a power valve mechanism.

A still further object of my invention is to provide a means to operate a power brake control mechanism and manual fluid pressure device sequentially.

Other and further objects and advantages of my invention will be seen by the following description of the accompanying drawing in which I have shown a cross sectional view of a fluid pressurizing device constructed in accordance with principles of my invention having an actuating linkage of my design embodied therewith.

In more detail, I show a brake actuating mechanism 10 for a set of wheel brakes 12 which actuating mechanism is operated by a brake pedal 14, as will be hereinafter explained. The brake mechanism includes a housing 16 provided with a fluid pressurizing chamber 18 and a valve chamber 20. The pressure responsive chamber 18 is of a stepped design to accommodate a small piston 22 and a larger piston 24 that are coextensive within the stepped pressure responsive chamber 18. The small and large pistons are arranged to provide small and large variable volume chambers respectively which, as seen, are independent of each other. In addition, a spring 26 is arranged to bias the small piston 22 against the large piston 24 and a larger spring 28 surrounding the rear portion of the small piston 22 is arranged to hold the large piston 24 against a removable wall 30 closing the rear of the large chamber and being held in place by a retaining ring 32. The small diameter chamber 18 is provided with a counterbore 34 leading to an outlet port 36 which is controlled by a residual pressure check valve 38 of familiar design. The outlet port 36 is connected by a conduit 40 to the brakes 12.

The small diameter piston 22 and the large diameter piston 24 are provided with rear portions 42 and 44, respectively, that project through the fixed wall 30 in the position shown in the drawing, and the inner or small diameter piston 22 has a push rod 46 mated to the rear portion 42, as by a retainer ring 48.

Within the valve chamber 20 there is mounted a valve housing 50 that abuts a collar 52 all of which are held against a notched washer 54 by a retaining ring 56 in the rear opening of the chamber 20. As with the pistons 22 and 24, the housing 50 and collar 52 are provided with appropriate type seals to cooperate with the chambers 18 and 20, respectively. I mount a spring 58 between the rear face of the collar 52 and a flange 60 of a valve plunger 62 in order to bias the valve plunger rearwardly to project beyond the housing 50 which projects beyond the brake mechanism housing 16. The valve plunger is provided with radial passages 64 and an axial passage 66 that terminates into a hollow portion 68 which is affixed to the front end of the plunger 62 and held or located within the collar 52 by a resilient disc 70 that is positioned by pressure in space 72 against the washer 54. The collar 52 is appropriately step bored behind the disc 70, as at 74, to provide a mount for a bearing sleeve 76 supporting the forward end of the valve plunger 62. A gap is allowed to exist between the front face of the sleeve 76 and the rear face of the disc 70 for purposes herein below explained. The forward end of the valve chamber 20 is provided with an axial bore 78 within which I mount a valve seat 80 and a spring held ball type poppet member 82 that is arranged to be removed from the valve seat 80 by the hollow member 68.

In addition, the forward end of the valve chamber 20 is provided with a radially displaced axial passage 84 that terminates into a cavity 86 in the forward end of the housing 16 which passage 84 and cavity 86 are communicated by a radial passage 88 to the forward or large diameter portion of the pressure responsive chamber 18; whereas the large diameter portion of the pressure responsive stepped chamber 18 is communicated by a radial passage 90 to a reservoir 92 and by a diametrically opposite radial passage 94 to the passage 96 leading to the passage 98 within the valve housing 50, which passage 98 opens into the space between the plunger 62 and the valve housing adjacent the radial passages 64 in the plunger 62. The reservoir 92 may be communicated by suitable conduits to a power system reservoir (not shown) to accommodate dumped fluid. If the power system or pump reservoir were communicated with passage 90 we would not need reservoir 92.

A power fluid is supplied to the inlet port 100 by a fluid power system (not shown) which those skilled in the art to which the invention relates visualize as including a pump, accumulator and reservoir means. From the inlet 100 the pressurized fluid enters a passage 102 that is closed at the end opposite the inlet by a shuttle valve 104 and provided with a radial passage 106 that is itself closed by a pressure responsive check valve 108 within a cavity 110 that is communicated as by passage 112 to the bore 78 aforementioned. As seen in the drawing, the shuttle valve 104 controls communication of inlet fluid to passages 114 and 116 and is also provided with a portion for abutting with a ball valve 118 adapted to control a pressure relief chamber 120. As seen, the ball valve is held within the pressure relieving cavity 120 between the shuttle valve 104 and a pin 122 held by a spring biased member 124 to urge the ball valve to seat to close communication of passage 116 with cavity 120. In addition, the passages 114 and 116 open to an annular space 126 that communicates by means of the passage 128 (shown in phantom) that in turn opens into an annular chamber 130 immediately behind the large piston 24 in the pressure responsive chamber 18. As shown in the drawing, the springs 26 and 28 are not opposed by any pressure in the chamber 130 and thus the pistons 22 and 24 are in the rearmost positions where the pedal 14 is extended to the maximum travel position shown. While in such a position the pressure responsive chamber 18 is opened via passages 88, 84, 66, 64, 98, 96, 94 and 90 to the reservoir 92.

In operation, the brake pedal 14 is depressed and, as the piston is normally biased by the larger piston 24 due to high pressure fluid in chamber 130 to abut on the forward end of the pressure responsive chamber 18, the brake 14 pivots about the connection 132 with the push rod 46 to rotate a lever or walking beam 134 about its pivot 136 with a bracket 138 mounted to the housing 16. The lever or walking beam 134 is provided with a finger 140 that cooperates with the valve plunger 62. Thus, as the pedal 14 is depressed the lever 134 causes the plunger 62 to unseat the ball type valve 82 allowing pressurized fluid from passage 112 to enter passage 84 about the notched washer aforementioned and into passage 88 and consequently out the residual pressure check valve into the outlet 36 and to the brakes 12 to apply same.

In the event there is a power failure and the fluid supplied to inlet 100 is of a low pressure or nonexistent the shuttle valve 104 will close off passage 114 and open passage 116 to relieve the pressure in chamber 130 allowing the pistons 22 and 24 to assume the position shown in the drawing, whereupon the brakes 12 may be actuated by depressing the pedal 14 and moving the push rod 46 inwardly as the pedal pivots about its pivotal connection 142 with the lever 134 in that the valve plunger 62 has bottomed and the beam or lever 134 cannot pivot about 136 any more.

Although for the purpose of explaining the invention a particular embodiment thereof has been shown and described obvious modifications will occur to a person skilled in the art, and I do not desire to be limited to the exact details shown and described.

Obviously the same advantage of this valving arrangement are present in a follow-thru system (for no-power actuation) by eliminating the pop up control valving and the pedal positioning piston 24.

I claim:

1. A means to independently actuate a power valve and fluid pressurizing device within a housing comprising:
   a support bracket affixed to said housing;
   a first lever pivotally connected intermediate its ends to said support bracket;
   a second lever pivotally connected to said first lever at one end thereof;
   a valve operating means affixed to said first lever at the end thereof opposite that connected to said second lever;
   a push rod connected to said second lever and said fluid pressurizing device;
   a fluid pressure motor operatively connected to said fluid pressurizing device to normally pull said second lever towards said housing until it abuts on said valve operating means so that said first and said second levers pivot in unison about the pivotal connection with said support bracket of said first lever to operate said valve means; and
   a means operatively connected to said fluid pressure motor to raise said second lever from said valve operating means to a position where force on said second lever can move said fluid pressurizing device independently of said valve operating means with a lower mechanical advantage than is available for operation of said power valve.

2. A fluid pressure system comprising:
   a fluid pressure source;
   a means to supply fluid pressure including a fluid pressure control valve and a movable wall within a housing;
   a support bracket affixed to said housing;
   a walking beam operatively connected to said support bracket intermediate the ends of said walking beam, said walking beam having a finger at one end operatively connected to said fluid pressure control valve;
   an actuating lever operatively connected to said walking beam at an end thereof opposite that having said finger;
   a fluid pressure motor operatively connected to said movable wall and said fluid pressure source to position said movable wall inwardly in said housing as long as said source is available to supply fluid pressure from said means;
   a push rod connected to said movable wall and said actuating lever such that as said movable wall is moved inwardly by said motor, said lever is moved to align with said walking beam until it is coincident therewith whereupon force on said lever will only pivot said beam about said support bracket to operate said valve; and
   a means to raise said lever away from said walking beam so that force thereon will pivot said lever about its connection with said walking beam permitting a lower mechanical advantage for operating said movable wall than for operating said valve.

3. A fluid pressure system comprising:
   a fluid pressurizing device including:
      (a) a housing,
      (b) a fluid pressure inlet in said housing having a chamber with axially displaced radial passages,
      (c) a control valve and fluid communication with one of said radial passages, and
      (d) a movable wall dividing a cavity in said housing into two variable volume chambers with passage means connecting one of said variable volume chambers to said control valve and the other of said variable volume chambers to the other of said radial passages;
   a lever mechanism for activating said fluid pressurizing device including:
      (a) a supporting bracket attached to said housing,
      (b) a first lever pivotally mounted by said supporting bracket and adapted to operate said control valve,
      (c) a second lever pivotally connected to said first lever, and
      (d) a push rod operatively connected to said movable wall and said second lever; and
   a valve means for said other radial passage to provide fluid pressure to hold said movable wall to allow said second lever to pivot about its connection with said push rod to control said power valve by pivoting said first lever about its connection with said bracket, said valve means being adapted to release said fluid pressure holding said movable wall in the advent of low fluid pressure as would occur during a power failure, to allow said second lever to pivot its connection with said first lever and activate said movable wall.

References Cited by the Examiner

UNITED STATES PATENTS

| 1,923,185 | 8/1933 | Bragg et al. | 60—10.5 X |
|---|---|---|---|
| 2,130,799 | 9/1938 | Hofstetter | 60—52 X |
| 2,229,247 | 1/1941 | Kamenarovic | 60—54.6 |
| 2,372,013 | 3/1945 | Rockwell | 60—54.5 X |
| 2,805,550 | 9/1957 | Ayers | 60—54.6 |
| 2,910,048 | 10/1959 | Ingres | 60—54.6 X |
| 2,959,450 | 11/1960 | Gladden et al. | 60—54.6 X |
| 3,120,155 | 2/1964 | Ayers | 60—54.6 X |

MARTIN P. SCHWADRON, *Primary Examiner.*

ROBERT R. BUNEVICH, *Assistant Examiner.*